May 20, 1952 — J. W. KOOS — 2,597,738
TELESCOPING FISHING ROD
Filed Aug. 29, 1949 — 2 SHEETS—SHEET 1
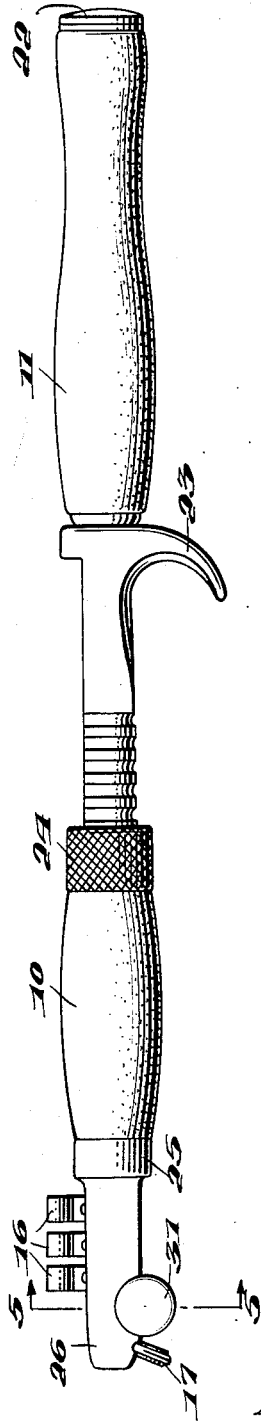
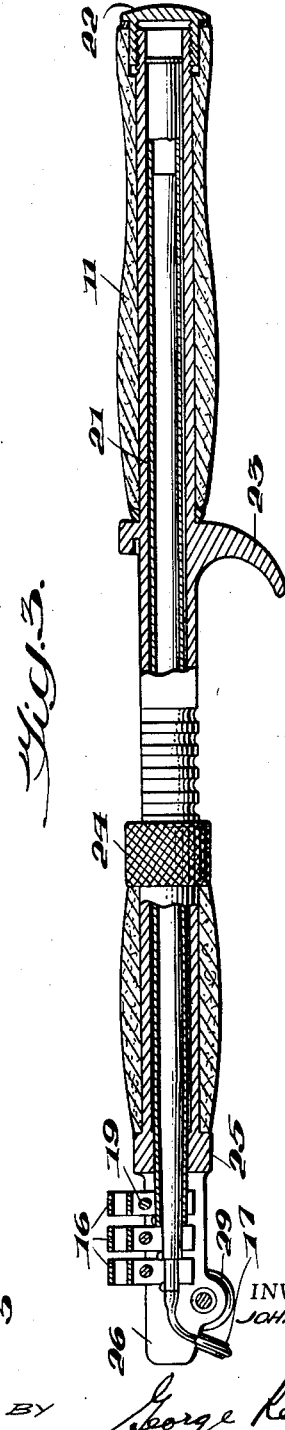
INVENTOR.
JOHN W. KOOS,
BY George Rex Frye
ATTORNEY May 20, 1952   J. W. KOOS   2,597,738
TELESCOPING FISHING ROD
Filed Aug. 29, 1949   2 SHEETS—SHEET 2
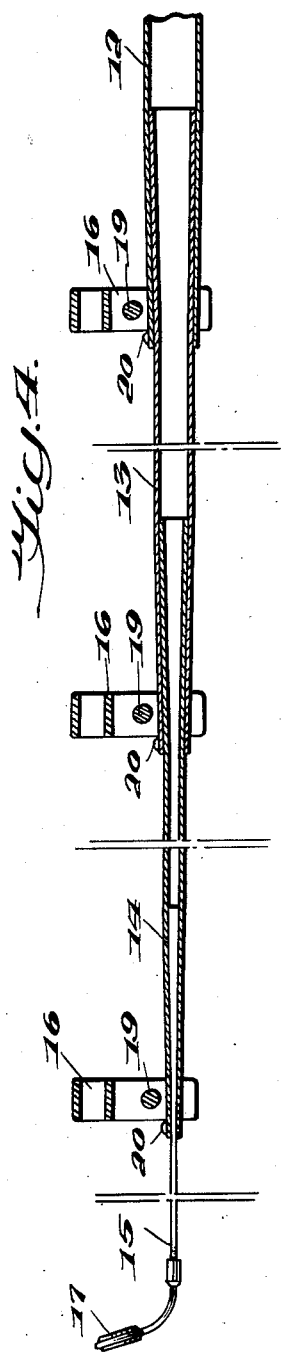
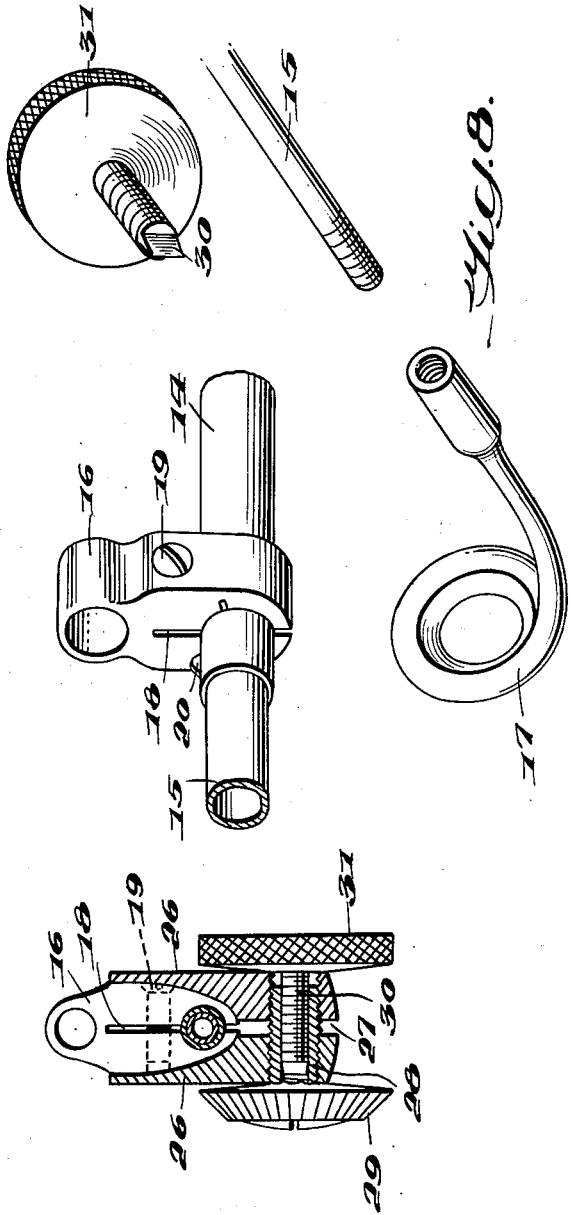
INVENTOR.
JOHN W. KOOS
BY George Rex Frye
ATTORNEY Patented May 20, 1952

2,597,738

UNITED STATES PATENT OFFICE 2,597,738

TELESCOPING FISHING ROD

John W. Koos, Detroit, Mich.; Victor W. Koos administrator of said John W. Koos, deceased Application August 29, 1949, Serial No. 112,859

4 Claims. (Cl. 43—18)

This invention relates to fishing rods, and particularly to fishing rods of the telescoping type wherein the rod sections may be collapsed into the handle section for convenient transportation.

One of the objects of this invention is to provide a fishing rod of permanently elastic tubular telescoping sections cooperating with means carried by the handle portion of the rod for clamping the rod sections in various telescoped positions, whereby the tip eye of the rod may be maintained at any desired distance from the handle between the fully collapsed and fully extended positions of the rod.

Another object of this invention is the arrangement of line guides upon the rod sections in position also to serve as clamping mediums to secure the rod sections in various adjusted positions, and particularly in the fully collapsed position of the rod.

A further object of this invention is the provision of a simple, effective and comparatively inexpensive clamp for maintaining the rod sections in various adjusted positions, which clamp is carried by the handle portion in position for convenient adjustment.

Other objects and advantages will be apparent from the following description taken in connection with the accompanying drawings illustrating a presently preferred embodiment of my invention, and wherein similar reference numerals designate similar parts throughout the several views.

In the drawings:

Fig. 1 is a side elevation of my improved fishing rod in its fully open or extended position.

Fig. 2 is an enlarged view showing the rod in its fully closed or collapsed position.

Fig. 3 is a view similar to Fig. 2 with the forward and rear extremities broken away and shown in section.

Fig. 4 is an enlarged longitudinal section through the extended rod sections.

Fig. 5 is an enlarged cross-section taken substantially on the line 5—5 of Fig. 2.

Fig. 6 is a detail perspective view of one of the line guides mounted on a rod section.

Fig. 7 is a detail perspective view of a screw driver for securing the line guides, and Fig. 8 is a detail perspective view showing the mounting of the tip line guide on the innermost rod section.

Referring now to the drawings, the numeral 10 designates my improved fishing rod and 11 the handle portion thereof. Rod sections 12, 13, 14 and 15 are shown as telescoped within the handle portion 11 in Figs. 2 and 3 and as open into the fully extended position of the fishing rod in Fig. 1. Rod sections 12, 13 and 14 have line guides 16 secured adjacent their forward extremities, and the innermost rod section 15 carries at its forward extremity the tip eye or guide 17 (Figs. 1 and 8). Preferably the tip is angled, substantially as shown, to bring the tip eye 17 into alignment with the other line guides 16 when swung upwardly to the position shown in Fig. 1, and to serve as one of the latching members when the rod is collapsed and the tip eye 17 swung through substantially 180° to the position shown in Fig. 2.

Each line guide 16 is constructed substantially as shown in Fig. 6 of somewhat resilient material with a central slot 18 extending from its lower wall to a point adjacent the eye, and with semi-circular cut-out portions on both sides of slot 18 sized to snugly fit the particular rod section with which the line guide cooperates whenever the slot 18 is partially closed, as by turning the clamping screw 19 mounted in the line guide 16 below the eye. To aid in maintaining the line guide 16 in desired position adjacent the forward extremities of the rod sections, each rod section except the innermost section 15 is provided with a protruding or hump portion 20 (Figs. 4 and 6), preferably struck up from the material of the rod section, and sized to pass through slot 18 only when the slot is open to its widest extent. As long as slot 18 is partially closed the line guide 16 cannot be detached from its rod section, and the hump 20 in one direction and the tapering formation of the rod section in the other direction prevents excessive movement of line guide 16 along its rod section should its clamping screw 19 be loosened by accident or design. In assembling, line guide 16 is passed over the forward extremity of its rod section while its slot 18 is open to its widest extent and then clamping screw 19 is turned to partially close the slot. Preferably, the open end of slot 18 passes over hump 20 while the semi-circular cut-out portions on each side of slot 18 are fitted over the rod section terminus, and when the line guide 16 has passed beyond hump 20 it is swung through an angle of substantially 180° to the position shown in Fig. 6 before clamping screw 19 is tightened.

The handle portion 11 is hollow, with a central passageway 21 extending longitudinally therethrough (Fig. 3) and being closed at its rear extremity when desired by the cap 22. Any desired contour may be given to the handle portion, the illustrated embodiment having the conventional pistol grip 23 and the usual knurled sleeve 24 for quickly securing a reel in position upon the handle. At its forward extremity handle portion 11 carries a clamp 25 for maintaining one or more of the rod sections retracted within the hollow handle through engagement with the line guides 16 of such rod section or sections. As best shown in Figs. 3 and 5, the line guides 16 are wider than the diameter of the rod section on which they are mounted, and clamp 25 is formed with laterally spaced clamping jaws 26 having their inner faces contoured to substantially conform to the shape of the sides of the line guides 16. Preferably clamp 25 is formed of one piece of resilient metal with a solid rear portion and its clamping jaws 26 spaced by means of a central slot 27 open at its forward extremity and extending throughout the major portion of the length of the clamp. The upper extremity of slot 27 opens into the contoured inner faces of the clamping jaws 26 (Fig. 5). Means are provided to move clamping jaws 26 toward and away from each other at will. As herein shown, a clamping screw 28 is threaded into the lower portion of clamp 25 adjacent its forward extremity for this purpose, an enlarged head 29 being arranged with a fluted edge (Fig. 8), to facilitate turning by hand and a cross-slot to enable use of a screw-driver if desired.

Since the use of a screw-driver is often needed, to quickly attain the desired tightness, and clamping screws 19 particularly are relatively small, I have arranged to mount a screw driver sized to fit such clamping screws in convenient position upon my improved fishing rod. In the illustrated embodiment, a screw driver 30 (Fig. 7) with an enlarged head 31 is externally threaded along its shank, and clamping screw 28 is made hollow and internally threaded to receive the shank of screw-driver 30 whenever desired (Fig. 5).

Tip eye 17 of the innermost rod section 15 is preferably secured by clamp 25 when the rod section is fully retracted into the handle portion by engagement with the lower forward portions of the clamping jaws 26, substantially as shown in Figs. 2 and 3. In other words, tip eye 17 is swung through an angle of substantially 180° from its position of use, as shown in Fig. 1, when it is desired to clamp the innermost rod section 15 within clamp 25. A pair of aligned notches may be formed in the lower faces of clamping jaws 26 to receive the peripheral portion of tip eye 17 in its clamped position.

The operation of my improved fishing rod is believed to be obvious. When not in use, the rod may be compacted into the fully collapsed position shown in Fig. 2, with clamp 25 securing the rod sections in such position by engagement of the upper portion of clamping jaws 26 with line guider 16 and the lower forward portion of such jaws with tip eye 17. In such position, the rod may be readily transported, either with or without a cover.

When it is desired to extend one or more of the rod sections, clamping screw 28 is loosened and the innermost rod section 15 first slid forward within the next surrounding rod section 14, then rod sections 14 and 15 advanced together, and so on. If a very short rod is desired, only rod section 15 need be advanced, or when a length of, say, two rod sections is desired, only rod sections 14 and 15 are advanced. When the desired length of rod has been reached, clamping screw 28 is again tightened to clamp the rod sections remaining within the handle portion by engagement with their line guides 16. Thus various lengths of rod intermediate the fully extended position of Fig. 1 and the fully collapsed position of Fig. 2 may be obtained at will. Tip tye 17 is turned to align it with the line guides 16 of the other rod sections and the line threaded therethrough in the usual manner.

While the handle portion and clamps may be made of any suitable material, such as Phosphor bronze, the rod sections are preferably formed of strong resilient material such as beryllium copper alloy to give the desired springiness to the rod, and are shaped to snugly interfit when in their fully extended positions to mutually support each other in use. To retract any of the rod sections from their extended positions I find that a few taps against the forward face of the line guide 16 on the rod section desired to be retracted will suffice to free such rod section from its interfit with the next larger rod section and enable ready sliding of the smaller rod section thereinto.

While it is apparent that the illustrated embodiment herein disclosed is well calculated to adequately fulfill the objects and advantages herein stated, it is to be understood that the invention is susceptible to variation, modification and change within the spirit and scope of the subjoined claims.

What is claimed is:

1. A fishing rod having a hollow handle portion, a series of rod sections telescoping into said handle portion, each rod section carrying a line guide adjacent its forward extremity, and a clamp carried by said handle portion in position to engage said line guides when said rod sections are fully collapsed into said handle portion.

2. A fishing rod having a hollow handle portion, a series of rod sections telescoping into said handle portion, each rod section carrying a line guide adjacent its forward extremity, and a clamp carried by said handle portion in position to engage and secure any of said line guides while its rod section is collapsed into said handle portion.

3. A fishing rod having a hollow handle portion, a series of inter-telescoping rod sections movable into said handle portion, each rod section carrying a line guide of slightly greater width than the diameter of the rod section, and a clamp carried by the handle portion in position to receive said line guides when said rod sections are collapsed into said handle portion, said clamp having lateral jaws normally spaced apart a distance greater than the width of said line guides, and means for moving said jaws toward each other to clamp any of said line guides then positioned between said jaws.

4. A fishing rod having a hollow handle portion, a series of inter-telescoping rod sections movable into said handle portion, each rod section carrying a line guide of slightly greater width than the diameter of the rod section, and a clamp carried by the handle portion in position to receive said line guides when said rod sections are collapsed into said handle portion, said clamp having a forward portion centrally slotted to provide lateral jaws normally spaced apart a distance greater than the width of said line guides, and means for moving said jaws toward each other to clamp any of said line guides then positioned between said jaws.

JOHN W. KOOS.

REFERENCES CITED

The following references are of record in the file of this patent:

UNITED STATES PATENTS

| Number | Name | Date |
| --- | --- | --- |
| 564,742 | Dunn | July 28, 1896 |
| 1,064,030 | Tredwell | June 10, 1913 |
| 1,473,437 | Lindstrom | Nov. 6, 1923 |
| 1,993,342 | Gurrieri | Mar. 5, 1935 |
| 2,317,129 | Brown | Apr. 20, 1943 |